Oct. 25, 1932.  A. VAN T. DAY  1,885,010
MULTIPLEX ELECTRICAL SIGNALING AND CONTROL
Original Filed July 24, 1923  8 Sheets-Sheet 1
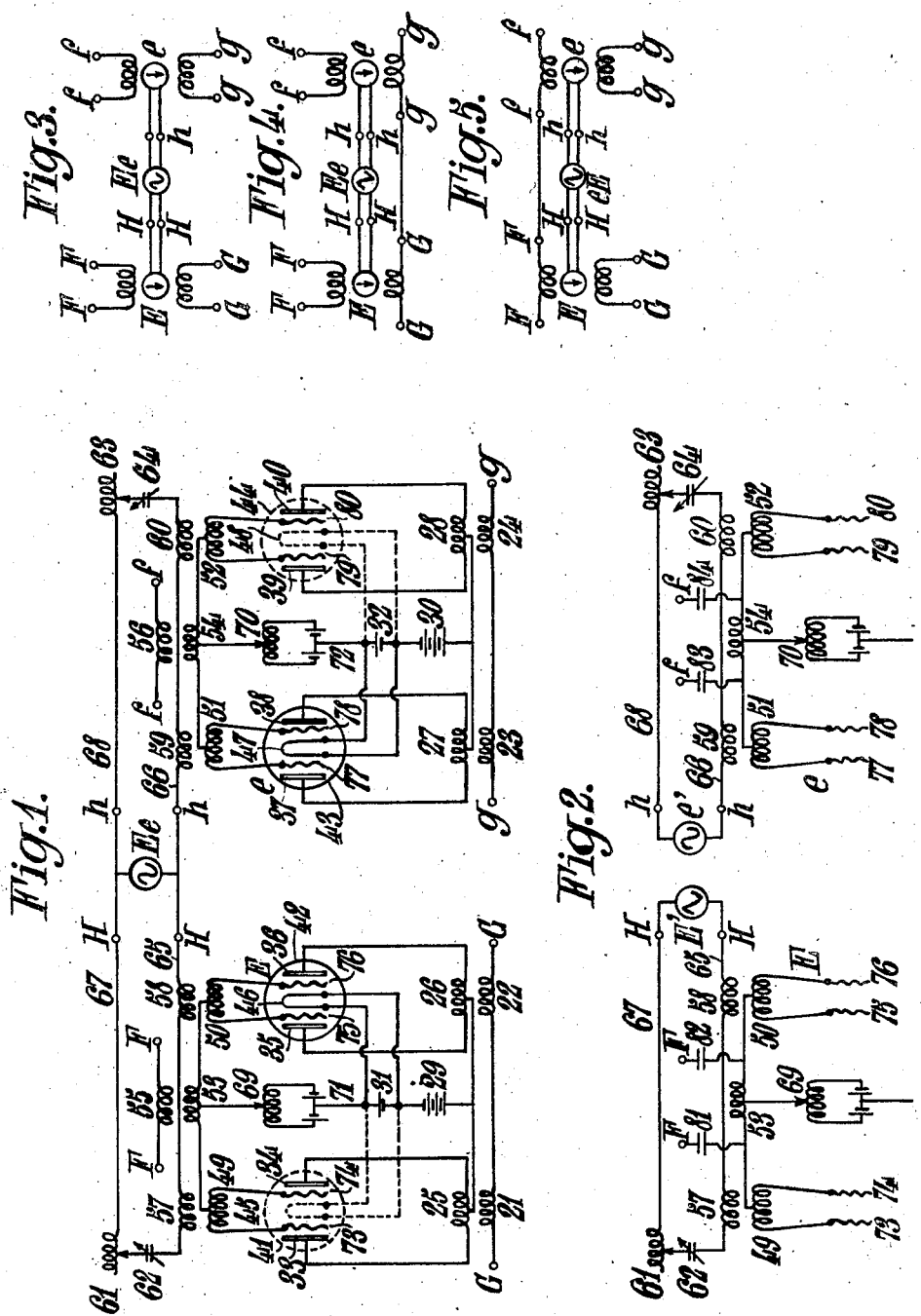
Inventor:
Albert Van Tuyl Day Oct. 25, 1932.  A. VAN T. DAY  1,885,010
MULTIPLEX ELECTRICAL SIGNALING AND CONTROL
Original Filed July 24, 1923  8 Sheets-Sheet 2
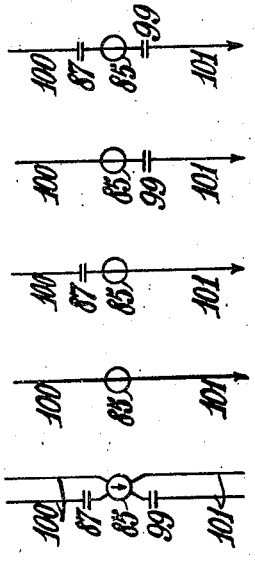
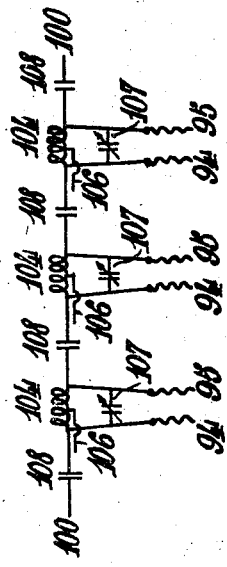
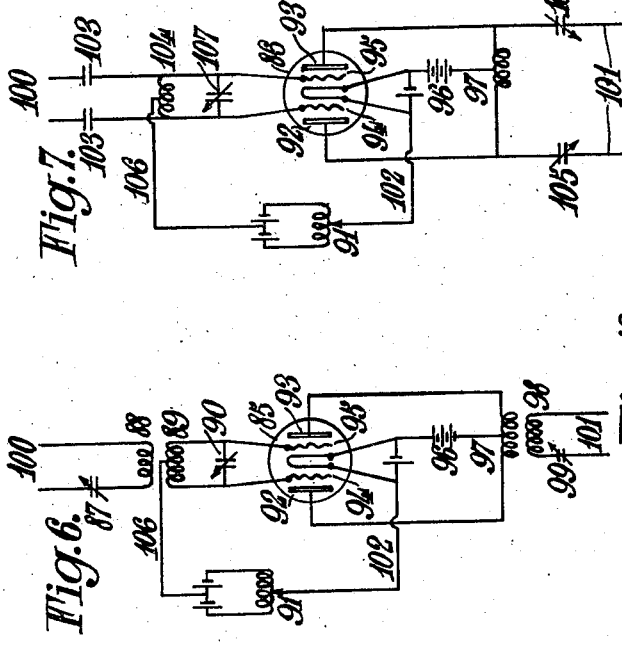
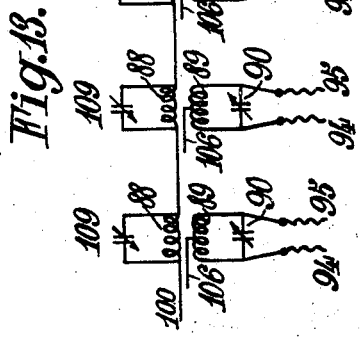
Inventor
Albert Van Tuyl Day Oct. 25, 1932.　　A. VAN T. DAY　　1,885,010
MULTIPLEX ELECTRICAL SIGNALING AND CONTROL
Original Filed July 24, 1923　8 Sheets-Sheet 3

Inventor.
Albert Van Tuyl Day

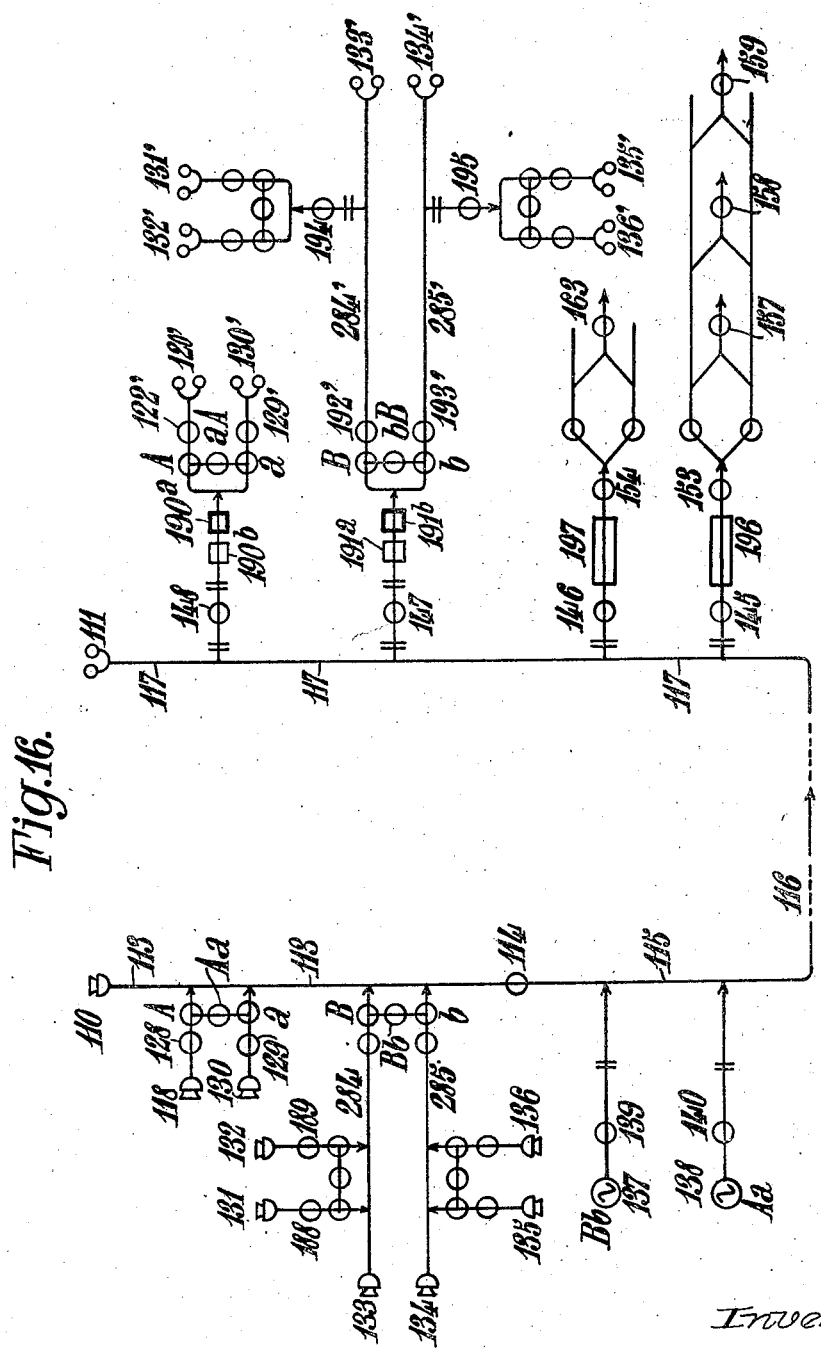

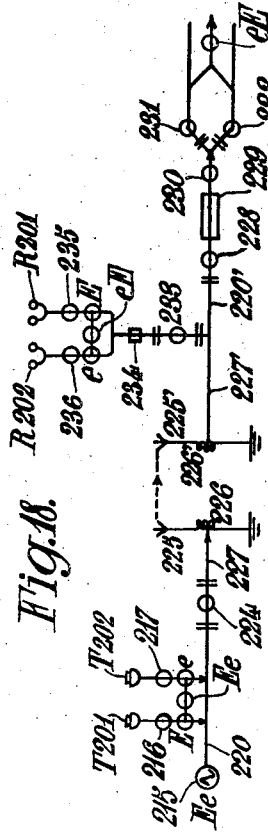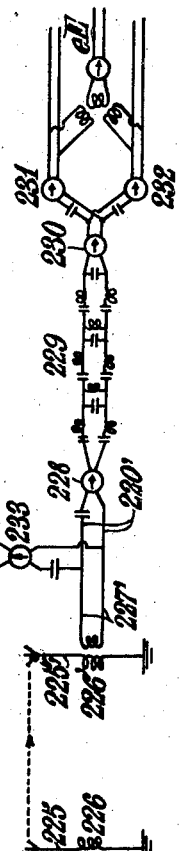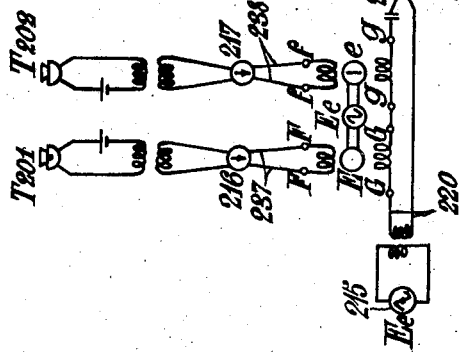

Patented Oct. 25, 1932

1,885,010

UNITED STATES PATENT OFFICE

ALBERT VAN TUYL DAY, OF RYE, NEW YORK

MULTIPLEX ELECTRICAL SIGNALING AND CONTROL

Application filed July 24, 1923, Serial No. 653,450. Renewed March 24, 1931.

Insofar as this application relates to the invention revealed in its Figures 1 to 20 inclusive, it is a continuation of my prior application Serial No. 587,260, filed on September 11, 1922. Also, this present application reveals and claims the generic phase-differentiated multiplexing method disclosed in my companion application Serial No. 273,054 and designed to employ any of the means shown in said companion application for deriving the local unmodulated waves which coact with the modulated carrier wave in the demodulating operation. My said companion application will mature in my companion patent bearing the issue number consecutively preceding the number of this patent.

This invention consists in improvements in methods and apparatus for carrier-wave signaling and control, either by radio transmission, or through metallic circuits. This means that the invention in its broadest aspect, may employ a carrier wave either to transmit a telephonic, telegraphic or other signal, or to transmit control to any distant device, for instance a ship or submarine, or an aerial torpedo. But for brevity hereinafter, the terms "signal" or "signaling" or the like, unless particularly qualified, will be employed in the broadest sense to include not only what is ordinarily called "signaling", but also to include the transmission of said control to distant devices in the manner of signals to which they are made inherently responsive.

These improvements are designed to increase the efficiency and excellence of transmission, and to reduce the disturbing effects of waves and currents foreign to the signal, and to accomplish the multiplex transmission of telegraph or telephone or other signals.

A particular object of the present invention is to accomplish the simultaneous transmission of as many signals as it may ever be desired to transmit simultaneously through a common circuit or radio medium. That is to say, the present invention aims to increase the possible plurality of multiplexing, or what may be termed the operable limit of multiplexity, to a number adequate for all commercial and social requirements of the present or future.

Several adaptations of this invention are illustrated in the accompanying drawings, as follows.

Figure 1 is a diagram of one form of the co-ordinator or productor, so designated because it functions as means for co-ordinating the effects of two wave-trains to produce a resultant wave-train having the form of the algebraic product of the co-ordinated wave-trains. When the productor performs that function at a sending station, it may be called a modulator, and when it performs at a receiving station it may be termed a demodulator.

Figure 2 is a diagram of modifications in the productor of Figure 1.

Figure 3 is an abbreviated diagram or symbol of the productor of Figure 1.

Figure 4 is a similar symbol of the productor of Figure 1, with its output coils connected for the sending translation of the conveyor waves, hereinafter termed the converging or collective translation, wherefore this productor is designated as a sending or converging or collective productor. The productor when thus employed may be termed a modulator.

Figure 5 is a similar symbol of the productor of Figure 1, with its input coils connected for the receiving translation of the conveyor waves, hereinafter termed the diverging or selective translation, wherefore this productor is designated as a receiving or diverging or selective productor. When thus employed the productor may be termed a demodulator.

Figure 6 is a diagram of one form of amplifier which may be employed in the practise of the invention.

Figure 7 is a diagram showing modifications in the input and output connections of the amplifier of Figure 6.

Figures 8, 9, 10, 11 and 12 are symbols employed in the subsequent diagrams to indicate transmission through amplifiers, for instance through amplifiers such as those of Figure 6 or Figure 7.

Figure 13 shows a way of connecting in series, the input circuits of several amplifiers such as shown in Figure 6.

Figure 14 shows a way of connecting in series, the input circuits of several amplifiers such as shown in Figure 7.

Figure 16 is a more abbreviated schematic diagram of the system of Figure 15, reduced to simpler symbols, and is presented to exemplify the meaning of these symbols as they appear in the ensuing diagram.

Figure 17 is a diagram of a rudimental system for practising the invention by radio-transmission.

Figure 18 is a more abbreviated schematic diagram of the system of Figure 17, reduced to simpler symbols, and is presented to exemplify the meaning of these symbols as they appear in the ensuing diagram.

Figure 15:
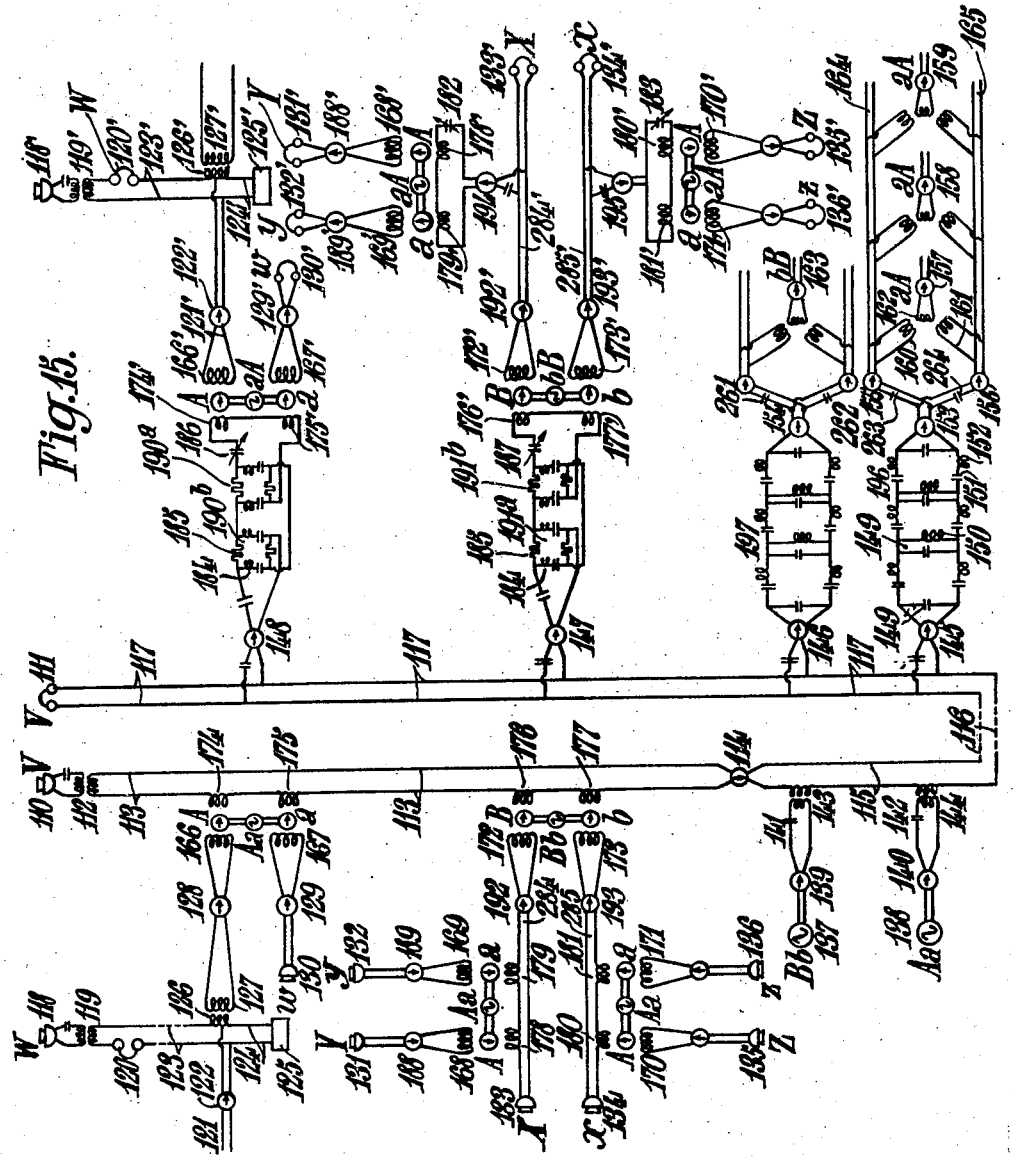
Figure 15 is a diagram of a somewhat rudimental system for practising the invention with conductive transmission circuits.

Figure 1 shows a double productor, or twin productors, that is to say, it comprises two similar productors, excited by a common source of alternating current $Ee$, one productor E consisting in the apparatus interposed between the input circuit F—F and output circuit G—G, and the other productor $e$ consisting in the similar apparatus interposed between the input circuit $f$—$f$ and the output circuit $g$—$g$. These twin productors are the same, and the productor E will be described in detail.

The productor E of Figure 1, is an audion device with four input grids 73, 74, 75, 76 and four output plates 33, 34, 35, 36. These may be disposed in a common vacuum enclosure in any symmetrical relation to a common lamp filament, whereby the grids 73 and 74 will equally control the currents flowing to the plates 33 and 34 respectively without affecting current flow to the plates 35 and 36, and whereby the grids 75 and 76 will equally control the current flow to the plates 35 and 36 respectively without affecting current flow to the plates 33 and 34. For diagrammatic convenience the common lamp filament is represented twice, i. e. at 45 and 46 to indicate its separate relations to the four pairs of grids and plates, whereby the foregoing separate controls are affected. The common vacuum container is likewise represented twice, i. e. at 41 and 42. If desired, separate filaments and vacuum containers may be employed in literal accordance with the diagram, and the principle of operation will remain the same. Therefore no confusion need result from the diagram, which for convenience of investigating the operation, may be regarded as showing entirely separate audion devices at 41 and 42, although these will be collectively designated as constituting the single productor E.

The grids of the productor E have their mean potential adjusted by the potentiometer 69, at a salient point in the characteristic curve showing the relation of grid-potential and plate current. Upon this mean potential in the grids, are superposed the input potential waves derived from the input circuit F—F through the input transformer 55, 53. The exciting potential waves derived from the exciting circuit H—H are also superposed on these grids through the exciting transformers 57, 49 and 58, 50. The resultant effects of all consequent current undulations in the four plate circuits, are combined as secondary waves in the transformer secondaries 21 and 22 connected in series in the output circuit G—G.

The exciting waves of the circuit H—H, when acting alone without input waves from the circuit F—F, will induce equal potential-waves in the output secondary coils 21 and 22; and these transformer coils are wound around their respective flux axes in such relative directions that their said equal waves have opposite simultaneous polarity in their output circuit G—G so as to produce a nil resultant therein. Also the input waves of the circuit F—F, when acting alone without exciting waves from the circuit H—H, will produce equal current waves in the opposed halves of the transformer-primary 25, and equal current waves in the opposed halves of the transformer-primary 26, so that their resultant will be nil in each of the transformer-secondaries 21 and 22. But when the input waves and the exciting waves act together on the grids of the productor E, its output circuit G—G derives from their co-action, a wave-train which is the algebraic product of their instantaneous superposed values. That is to say, the output wave-train is the algebraic product of the input and exciting wave-trains.

The frequency of the exciting current applied to any productor will be termed the productor frequency. The productors E and $e$ have the same productor frequency, being excited by the common source $Ee$. But the currents in their respective exciting circuits H—H and $h$—$h$, are rendered in quadrature phase relation by the phase-adjusting means 61, 62 and 63, 64. The associated productors E and $e$ are termed twin productors, or twin quadrature productors. The quadrature relation of their exciting currents is however, a mere ideal for maximum efficiency. As will appear hereinafter, their phase-differentiated selectivity would be theoretically effective with any phase difference less than 180 degrees.

As indicated in Figure 2, the input circuits F—F and f—f of the productors E and e, may be led through condensers 81, 82 and 83, 84 to the termini of the inductances 53 and 54, in lieu of employing the primary coils 55 and 56 of Figure 1. These condensers are to isolate the mean grid potentials from the input circuits.

Figure 2 also indicates that the twin productors E and e may be excited by separate sources E' and e', in lieu of the common source Ee of Figure 1. In this instance, means will be employed to insure synchronism between the sources E' and e', and if they are not maintained in quadrature phase relation, the phase-adjusting means 61, 62 and 63, 64 will be employed to effect phase-quadrature in the exciting circuits of the twin productors E and e.

In the symbol of Figure 3, the coils connected respectively between the input terminals F, F and between the input terminals f, f, indicate generically any manner of impressing the input waves upon the grids of the respective twin productors E and e. The direct linear connections of the twin productors with the source Ee, indicate generically any means of producing synchronous quadrature exciting waves in the grids of these productors. The coils connected respectively between the output terminals G, G and between the output terminals g, g, indicate generically any manner of deriving in the output circuit of each productor the resultant wave appearing as the product of its input and exciting wave trains. The arrows appearing in the circles E, e, indicate the direction of transmission through the productors.

The symbol of Figure 4 is the symbol of Figure 3 with the output circuits G—G and g—g of the twin productors connected in series to combine their resultant or translated wave-trains into one carrier wave-train which is the algebraic sum of the output waves of the twin productors. This arrangement constitutes the twin sending productors which may be collectively designated as a converging or collective productor, because the signals carried in the carrier-waves of their separate input circuits are converged or collected into their common output circuit. The productors thus employed for sending may be termed modulators.

The symbol of Figure 5 is the symbol of Figure 3 with the input circuits F—F and f—f of the twin productors connected in series to apply the received carrier wave-train to the grids of both productors so as to separately produce in their separate output circuits G—G and g—g; the separate resultant or translated carrier wave-trains which are the products of the received carrier wave-train and the respective exciting waves in the two productors. Thus the output circuit G—G derives a translated carrier wave-train which is the product of the received wave-train and that phase of the exciting wave which is applied to the productor E, while the output circuit g—g likewise derived a separate and different translated carrier wave-train which is the separate product of the same received wave-train and that phase of the exciting wave which is applied to the productor e. This arrangement constitutes the twin receiving productors which may be collectively designated as a selective or diverging productor because the signals carried by the received carrier-waves in their common input circuit are selectively translated or diverged into their separate output circuits. The productors thus employed for receiving may be termed demodulators.

The amplifier of Figure 6 is an audion device. The mean potential of its grids is maintained at the point of maximum amplifying efficiency by the potential adjusting device 91. Its input circuit 100 transmits the input waves to the grids through the transformer 88, 89. If desired these coils may be tuned by condensers such as 87 and 90, to a particular frequency component of a composite carrier wave-train. The transformer 97, 98 transmits the plate-circuit waves to the output circuit 101, which may likewise be tuned by a condenser as at 99.

The amplifier of Figure 7 is like that of Figure 6, with the following differences: The wires of the input circuit 100 transmit the input waves to the opposite grids through the condensers 103 which isolate the mean grid potential from the input circuit. A grid condenser 107 may be tuned with the inductance 104, for a particular frequency-component of a carrier-wave. The plate-circuit waves are transmitted to the output circuit 101 through condensers 105 which isolate the output circuit from the plate battery, and also may be adjusted to tune the output circuit.

Figure 8 is a symbol of the amplifier of Figure 6, or any suitable amplifier. The circle 85 symbolizes the amplifier proper; the arrow in this circle indicates the direction of transmission; the wires 100 indicate the input circuit; the wires 101 indicate the output circuit; and the condensers 87 and 99 respectively indicate that both the input and output circuits are tuned. The symbol may be used without the condenser in either circuit when the tuning thereof is not to be indicated.

Figure 9 is a still more abbreviated symbol of the amplifier of Figure 8, without tuning condensers. Here the single line 100 symbolizes both wires of the input circuit; the single line 101 symbolizes both wires of the output circuit; and these two lines are united to form one transmission line passing through the amplifier to symbolize the transmission of the wave therethrough. When an arrow point appears in this transmission line it indicates the direction of transmission through the amplifier.

The amplifier symbol of Figure 10 is the same as that of Figure 9 with a condenser symbol introduced at 87 to indicate tuning of the input circuit.

The amplifier symbol of Figure 11 is the same as that of Figure 9, with the introduction of a condenser symbol at 99 to indicate tuning of the output circuit.

The amplifier symbol of Figure 12 is the same as that of Figure 9, with the insertion of condenser symbols at 87 and 99 to indicate tuning of the input and output circuits respectively.

Figure 13 shows how amplifiers such as that of Figure 6, may have their transformer primary coils 88 connected in series in a common input circuit 100—100. When this is done, the several primary coils 88 may be tuned to different carrier-wave components by their respective shunt condensers 109, while their respective secondary coils may be correspondingly tuned by the condensers 90.

Figure 14 shows how amplifiers such as that of Figure 7 may have their grid inductances 104 connected in series in a common input circuit 100—100, with condensers 108 interposed to isolate the mean grid potentials in the several amplifiers. When this is done the several amplifiers may be tuned to different carrier-wave components by their respective condensers 107 in shunt with their respective inductances 104.

Figure 15 shows a telephonic transmission line 116 extending from the transmitter at 110 to the receiver at 111. The transmission from 110 to 111 is effected by ordinary voice waves, but the output coils of the twin sending productors at 174, 175 and 176, 177, will superpose thereon, the high-frequency carrier-waves which are to be employed for multiplexing the transmission; and the receiving amplifiers at 148 and 147 will transmit these carrier-waves to the input coils 174', 175' and 176', 177' of the twin receiving productors there indicated.

The transmission line 116 may extend between distant telephone exchanges for the multiplex transmission of signals communicated through other lines reaching the said exchanges. In the diagram Figure 15, the multiplex line 116 is arranged for transmission in only one direction between such exchanges, but experts will understand how the line can be arranged for simultaneous transmission in reverse direction when the sending and receiving apparatus of the diagram are duplicated for reverse transmission. Or an entirely separate multiplex transmission line may be employed for reverse transmission between the duplicated sending and receiving means. It will be understood that these same generalities apply as well to all the other diagrams which represent multiplex transmission in one direction only.

In accordance with this invention, multiplexing is to be accomplished by superposing in one transmission line or medium, combined effects of two or more carrier-wave trains differentiated by phase or frequency or both phase and frequency, and having wave lengths considerably shorter than the voice waves or other signaling waves which are to be conveyed and reproduced at the receiving station.

The system of Figure 15 employs two fundamental carrier wave frequencies, and separately employs two phase-differentiated carrier waves derived from each frequency. For convenience in describing Figure 15 and the ensuing diagrams, the several fundamental carrier-wave-trains of different phases and frequencies will be designated in the alphabetical order A, a, B, b, C, c, D, d, E, e, in which the capital and small forms of a given letter will designate respectively the advance phase and the lagging phase of a common frequency. These wave-train characters appear in the diagrams beside the sources from which the wave-trains are respectively derived, and beside the productors which are respectively excited by these wave-trains. For convenience of description it will be assumed that this alphabetical order of the fundamental wave trains corresponds with the arithmetical order of their frequencies, the Aa wave-trains having the lowest frequency, and the Ee wave-trains having the highest frequency.

In Figure 15, the prime sources of the fundamental carrier-waves A, a and B, b are indicated at 138 and 137 at the sending end of the multiplex line 116. The sources diagrammatically associated with the several twin sending productors are marked Aa or Bb to indicate that they are physically identical with the respective prime sources.

The wave-trains of the prime sources 138 and 137, are reproduced at the receiving end of the multiplex line 116 in the following manner. The wave-trains of Aa frequency and of Bb frequency are transmitted from their respective sources 138 and 137 through respective amplifiers 140 and 139 and respective loose couplings 144 and 143, to the transmission line 116. These couplings may be tuned to the frequencies of their respective wave-trains. This arrangement is not employed to augment the energy of the fundamental wave-trains in the line 116, but rather to provide a one-way transmission to the line, which shall prevent transmission of either wave-train from the line to the source of another wave-train, because a mingling of the wave-trains at their sources would obviously destroy the frequency differentiation of the currents from these sources. However, the tuned loose couplings alone might serve this purpose without interposing the amplifiers for one-way transmission between the sources and couplings. In any event it is desirable for economy, to transmit relatively small energy from the sources 138 and 137 to the transmission line 116, and for this purpose the amplifiers 140 and 139 may act very weakly, and have a decimal amplifying factor, and also the couplings 144 and 143 may be very loose.

The relatively weak wave-trains of $Aa$ frequency and $Bb$ frequency thus superposed in the line 116, are selectively amplified by the amplifiers 145 and 146 connected in parallel across the receiving end of the line, and tuned to these frequencies respectively. These amplifiers transmit the said respective wave-trains through the respective sifting circuits or filters 196 and 197, each tuned to transmit most efficiently its said respective wave-train while suppressing or sifting out all other waves. This is accomplished by tuning both the parallel inductance-and-capacity 150, 149, and the series inductance-and-capacity 152, 151, to the wave-train which is to be transmitted. The sifting circuits 196 and 197 deliver their wave-trains to amplifiers 153 and 154 respectively tuned thereto, and each wave-train may be thus transmitted through any number of successive sifting circuits and amplifiers which may be necessary to restore it to substantial power and suppress all other waves superposed on it. The diagram indicates such transmission through only one sifting circuit and two amplifiers, but in any event, each wave-train thus separated and amplified may be delivered to two phase-splitting amplifiers such as 155, 156 whose input circuits are connected in parallel and include phase adjusting condensers such as 263 and 264.

The phase-splitting amplifiers such as 155, 156 deliver their wave-trains in quadrature phase relation to respective output circuits such as 164, 165, which energise any desired number of rotary fields, as at 160, 161. Each rotary field induces its waves in an inductor such as 162 included in the input circuit of a final amplifier such as 157, 158 or 159, and the angular positions of these inductors in their rotary fields are varied to adjust the phase of their wave-trains delivered to the final amplifiers. Thus the final amplifiers constitute sources at the receiving end of the transmission line 116 for supplying to the receiving productors wave-trains in any desired phase and always in synchronism with those of the prime sources at the sending end of the line.

It will now be understood that the sources $Aa$ and $Bb$ diagrammatically associated with the twin receiving productors, may be physically identical with the appropriate phase adjusted amplifiers such as 157, 158, 159, 163, etc.

The transmitter W at 118 and its associated receiver 120 indicate a telephone station communicating through an ordinary line 123 with an exchange including repeating coils such as 126 and 127 for transmission from the ordinary line to the multiplex line 116. The incoming signal for the receiver 120 is received at the exchange through wires 121 and the amplifier 122 whose output circuit is neutrally related to the primary repeating coil 126 by a symmetrical balanced connection between the telephone line 123 and an artificial line 124, 125.

The transmitter W at 118 delivers voice waves through the repeating coils 126, 127 and amplifier 128, to the input coil 166 of a sending productor A whose output coil 174 is introduced into the input circuit 113 of the sending amplifier 114 which transmits through the multiplex line 116. Thus the sending productor or modulator A at 166, 174, produces in the transmission line 116, a carrier wave-train which is the product of the voice wave from 118 and the advance phase A of the exciting wave from the source $Aa$. Hence, if A be taken as an algebraic symbol for the instantaneous value of this phase of the exciting wave, and if W likewise designates the instantaneous value of the voice wave from 118, then their resultant carrier wave-train in the line 116 can be algebraically denoted as AW.

This product carrier-wave AW will have the form of a carrier-wave A of the higher frequency with its amplitude modulated in correspondence with the voice wave W of lower frequency. It can therefore be selectively received in a resonant circuit tuned to the higher frequency. It is transmitted through the sending amplifier 114 and multiplex line 116 to the receiving amplifier 148 tuned to the A frequency, but not tuned so acutely as to substantially impede or suppress its side-bands constituting the said modulation by the W frequency. Thus the amplifier 148 transmits the said AW carrier-wave through the tuning-out bridges 190$b$ and 190$a$ (hereinafter described) and through the input coils 174' and 175' of the twin productors or demodulators excited by the fundamental waves A and $a$ respectively.

The transmitter $w$ at 130 and its connection with the input circuit of the amplifier 129, are intended to symbolize apparatus equivalent to the transmitter 118 and its line and connections leading to the amplifier 128; and every other transmitter symbol excepting 110 is to be likewise interpreted.

The transmitter at 130 will deliver a voice wave which may be algebraically denoted as $w$, and which will be translated by its sending productor into a carrier wave-train $aw$, the product of the voice wave $w$ and the lagging phase $a$ from the source $Aa$. This wave $aw$ is induced in the productor output coil 175 in the input circuit 113 of the sending amplifier 114, and is thus superposed on the wave AW therein, to produce a resulting wave train which is the algebraic sum $AW + aw$. The $aw$ component of this wave-train will also have the form of a wave-train from the $Aa$ source varying in amplitude in accordance with the wave $w$ of voice frequency. Hence the combined wave-trains $AW + aw$ have the $Aa$ frequency, and have modulations or varying amplitudes conveying the voice variation of both the W and $w$ waves. Therefore the wave $aw$ will be transmitted through the tuned receiving amplifier 148 and the productor input coils 174', 175' together with the wave AW as before described; and the resultant current in these input coils will be the algebraic sum of these superposed waves, $AW + aw$.

In like manner, the receiving amplifier 147 is tuned to the frequency of the $Bb$ waves, and transmits through the input coils 176', 177' of a $Bb$ receiving productor, the superposed carrier wave-trains $BX + bx$ produced by the transmitters 133 and 134 acting through their $Bb$ sending productors 172, 176 and 173, 177.

The tuning-out bridges 190a, 190b, 191a, 191b are interposed between the receiving amplifiers and the receiving productors, to suppress or minimize in each twin pair of productors the wave-trains intended for all the other receiving productors. Each bridge includes equal non-inductive resistances 185 in one pair of opposite legs, and equal tuned inductance-and-capacity 184 in its remaining opposite legs, and the ohmic resistance is made equal in all four legs, while the input and output circuits of the bridge are connected across its two diagonals. Each bridge has its inductance-and-capacity legs tuned for the frequency of the wave-train which it is designed to suppress. Under these conditions, a given bridge will not transmit a constant wave-train of the frequency for which it is tuned, but it will transmit wave-trains of other frequencies.

If the bridge tuning is flat, i. e. not too acute, the bridge will not only suppress the constant or unmodulated wave component of its given tuned frequency, but will also nearly suppress the side-bands thereof which constitute the amplitude variations correspond with the lower frequency modulating waves. On the other hand, if the bridge tuning is very acute, i. e. if its reactances are relatively large, the bridge will still suppress the constant wave of its given tuned frequency, but will effectually transmit the side-bands or variations thereof, because the oscillating inertia or energy of the tuned bridge legs will be too great for rapid changes in wave amplitude. The acutely tuned bridge will transmit all waves excepting the constant unmodulated wave-train of the frequency for which the bridge is tuned.

The bridge 190b is tuned flat in order to suppress both the constant wave of $Bb$ frequency derived from the loose coupling 143, and also the side-bands or modulation components superposed thereon from the sending productor output coils 176, 177.

The bridge 190a is acutely tuned in order to suppress the constant wave of $Aa$ frequency derived from the loose coupling 144, without suppressing the modulation components superposed thereon from the sending productor output coils 174, 175.

Likewise the bridge 191a is tuned flat to suppress all the constant and modulated waves of the $Aa$ frequency derived from the coils 144, 174 and 175; and the bridge 191b is acutely tuned to suppress the constant waves of $Bb$ frequency from the coils 143, and to transmit the variable $Bb$ waves or modulations from the coils 176 and 177.

Just as the $Aa$ twin sending productor at 166, 167, produces in its output circuit 113 the compound carrier wave-train $AW + aw$; in like manner the similar $Aa$ sending productor at 168, 169, produces in its output circuit 284 a compound carrier wave-train $AY + ay$ conveying modulations or amplitude variations corresponding with voice waves Y and $y$ from the transmitters 131 and 132. This carrier wave-train $AY + ay$ is superposed on the simple voice-wave X from the transmitter 133, to produce the compound wave $X + AY + ay$ in the said circuit 284 which transmits said compound wave through the amplifier 192 to the input coil 172 of the B sending productor, priorly mentioned as translating the said voice wave X. This B productor translates the said compound wave into a carrier wave which is the product of the compound wave and the B wave, to wit, $B(X + AY + ay)$; and this carrier wave-train of fundamental B frequency is rendered in the producer output coil 176.

Likewise the $b$ sending productor at 173 derives from its controlling transmitters 134, 135, 136, a compound wave $x + AZ + az$, which it translates into a carrier wave-train $b(x + AZ + az)$ in its output coil 177.

Now it will be clear that the sending productor output coils 174, 175, 176 and 177, will jointly impress on the grids of the sending amplifier 114 a compound train of potential or E. M. F. waves which will be the algebraic sum of their several wave-trains; and this compound carrier wave-train in the grids will be superposed on the voice wave Z which the grids derive from the transmitter 110. Therefore the whole grid-exciting wave to be duplicated in the amplifier output circuit and transmission line 116, may be expressed (first summation)

$$V+AW+aw+B(X+AY+ay)+b(x+AZ+az).$$

This is equivalent to the summation of nine terms representing nine independent superposed wave-trains, to wit: (Second summation)

$$V+AW+aw+BX+BAY+Bay+bx+bAZ+baz.$$

This true summation of the component wave-trains in the grids and output circuit of the sending amplifier, may be perhaps most exactly attained in the amplifier circuits of Figure 7, when their inductances 104 and 97 are very heavy, for instance it may be accomplished with fine windings and iron cores.

It is evident that the first term of the second summation represents the simple voice wave V from the transmitter 110; while the eight ensuing terms are product terms representing eight superposed carrier-wave-trains and each including only one of the separate voice-wave factors $W, w, X, x, Y, y, Z, z$. It will also be noted that the symbols of each product term, that is the symbols of each carrier wave-train, appear in the inverse order of converging transmission from its voice transmitter through its sending or converging productors. Therefore the origin of any wave-train in the multiplex line 116 may be found by following the system backward through the successive productors corresponding with the symbols of its product term. Also, this order of symbols in the product term of each carrier wave-train, indicates the order of receiving or diverging productors through which it will be retranslated for effective rectification to reproduce the voice wave in its final receiver. For instance, the last term $baz$ of the second summation, represents the carrier wave-train which originates in the voice-wave $z$ at 136 and is translated successively by the converging productors $a, b$, and retranslated or rectified successively by the diverging productors $b, a$, to reproduce the voice-wave $z$ in the receiver at 136'.

It will of course be understood that the constant $Aa$ and $Bb$ wave-trains from the prime sources 138 and 137, will be superposed on the variable signaling wave-trains of the foregoing summations, in the line 116.

For the purposes of selective tuning in the receiving apparatus, each carrier wave-train or product wave-train may be treated as having the frequency of the shortest wave-train among its factor-waves, although its amplitude will be varied or modulated in accordance with its longer factor-waves. Hence, for convenience of expression hereinafter, a carrier wave-train which is the product of two or more wave-trains, will be referred to as having the frequency of its shortest factor-waves. For instance the product-wave train $baz$ may be referred to as a carrier wave-train of $Bb$ frequency.

The flat tuned bridge 190$b$ will tend to suppress all wave-trains of $Bb$ frequency, i. e., all product wave-trains of $Bb$ frequency, as well as the constant $Bb$ waves derived from the prime source at 137. Likewise the flat tuned bridge at 191$a$ will tend to suppress all product wave-trains of $Aa$ frequency, as well as the constant $Aa$ waves derived from the prime source at 138. At the same time the acutely tuned bridges 190$a$ and 191$b$ will tend to suppress respectively the constant or unmodulated $Aa$ waves and the constant or unmodulated $Bb$ waves. Therefore the bridges will tend to shield the $Aa$ productor input circuit 174', 175' from all waves excepting the modulation components wave-trains (product) of $Aa$ frequency, and will likewise tend to shield the $Bb$ productor input circuit 176' 177' from all waves excepting the modulation components (product wave-trains) of $Bb$ frequency.

But the tuning-out bridges will not even theoretically effect a complete suppression of the side-bands or modulation components of the wave-trains for which they are respectively tuned, nor is it to be presumed that they would in practise be tuned so accurately as to wholly suppress the constant unmodulated wave-trains of their respective tuned frequencies. The functions of these bridges are in no wise essential to the practise of the invention in its broader aspect, but may be useful in permitting a range of carrier wave-trains having smaller frequency differences than would be permissible without the bridges or some equivalent for them.

For the purposes of explaining the functions of the receiving or diverging productors, it may be assumed that each wave-train received from the multiplex transmission line, is transmitted through all receiving amplifiers such as 148, 147, to all the receiving productors; and that its effects are transmitted through all the productors to all their receivers. This assumption will also disregard all selective tuning in the circuits of all the receiving amplifiers and productors, as at 147, 148, 186, 187, 194, 195, 182, 183.

Upon the foregoing assumption, the individual effects of the constant $Aa$ and $Bb$ wave-trains, and of the nine signaling wave-trains of the second summation, may be separately considered.

The constant wave-train of the $Aa$ frequency will be translated by the $Aa$-productors 174', 175' into product wave-trains in the productor output circuits, which will depend on the phase relations of the productor input and exciting currents, but which can have no variable rectified components because the input and exciting factor-waves are constant, and in a constant phase relation. Hence no audible response of the receivers 120' and 130' can result.

In the B$b$-productors 176', 177', the constant wave of A$a$ frequency, will be translated into product waves including rectified components, or beat-waves, whose frequency will equal the difference between the input A$a$ frequency and the B$b$ exciting frequency or productor frequency. Hence the A$a$ and B$b$ frequencies must be so chosen as to make their differential frequency above the audible limit, unless it shall be tuned-out from the productor output circuits, or anteriorly prevented by suppressing the constant A$a$ waves in the productor input circuits. When either of these provisions is assured, the A$a$ waves can produce no audible effects in the receivers 133' 134' responsive to the productor output circuits. The receivers 131', 132', 135'. 136', cannot be audibly affected by the product-waves resulting from translation of the constant A$a$ waves through the B$b$-productors 176', 177', because after such translation these product-waves have the B$b$ frequency factor which cannot be rectified by the A$a$-productors at 178', 179' and 180', 181'.

For reasons corresponding with the foregoing as ascribed to the constant A$a$ waves, it will also be impossible for the constant B$b$ waves to produce audible effects in either the B$b$-productor output circuits, or the A$a$-productor output circuits.

The simple voice wave V from 110 actuates the receiver at 111, which does not audibly respond to the constant A$a$ or B$b$ waves, nor to the unrectified product wave-trains of the second summation.

This voice wave is translated by the A-productor at 174' into an unrectified product-wave AV, which is transmitted from the productor output coil 166' through the amplifier 122' and line 123' to the receiver 120'. But this receiver will not audibly respond to such an unrectified wave. The receiver at 130' is likewise unresponsive to the product-wave $a$V which it likewise derives by translation of the voice wave V through the $a$-productor at 175'.

The receivers at 133' and 134' are likewise unresponsive to the unrectified product-waves BV and $b$V respectively derived through the B$b$-productors at 176', 177'.

The product-wave BV impressed on the receiver 133', is likewise impressed on the grids of the amplifier 194, and is translated by the A$a$-productors 178', 179', respectively into two product-waves BAV and B$a$V which are transmitted to the receivers 131' and 132' respectively. But these product-waves are unrectified so that the said receivers will not audibly respond to them. For corresponding reasons, the receivers 135', 136' are likewise unresponsive to the product-waves $b$AV and $ba$V which they respectively derive through the A$a$-productors 180', 181' from the $b$V product-wave in the circuit of the receiver 134'.

The leading product-wave AW derived from the sending A-productor of leading phase at 166, 174, flows through the common input circuit of the receiving A$a$-productors at 174', 175', which may be tuned to the A$a$ frequency by a series condenser 186. The lagging $a$-productor 175', 167', will translate this AW wave into a product wave $a$ (AW). The $a$(AW) wave is obviously the product of the voice wave W and two factor-waves of the same frequency, so that its rectified effect, or mean undirectional value, which is the algebraic sum of its periodic positive and negative values, will depend on the phase relation of its synchronous factor-waves. Obviously, if these synchronous factor-waves reverse simultaneously, their product sign will always be the same, either positive or negative, so that the rectified component of their product will be at maximum. But if each factor-wave is reversed at the instant of positive or negative maximum in the other factor-wave, i. e., if the synchronous factor-waves are in quadrature phase relation, then the algebraic sign of their product must be reversed by each reversal of the sign of either factor-wave, so as to result in equal positive and negative intervals in the sign of their product ordinates, thereby balancing the ordinates of opposed sign and eliminating the rectified component of the product wave.

It will not matter if factors not above considered shall alter the assumed quadrature phase relation of the productor input and exciting waves, in which their joint or product rectification is eliminated. They must in any event have a phase relation in which they will coact with nil rectification, because the algebraic sum or mean value of their product ordinates, will have a maximum positive value with one phase relation and a maximum negative value with another phase relation, and must gradually change from positive to negative, as the first phase relation is graduated into the second. Hence the product-wave $a$(AW) derived in the output circuit of the lagging $a$-productor 175', 176', from the transmitter at 118, may be rendered silent in the receiver 130', by adjusting the phase of the exciting current supplied to this productor, and represented by the $a$-factor of the wave. That is to say the product wave $a$(AW) will be rendered silent by adjusting the phase relation of its $a$A factors. This silent phase relation of the synchronous factor-waves will generally occur at or near quadrature, but may be altered in some types of productors under some conditions, as when the input factor-wave includes a constant component which is not in phase-consonance with the exciting factor-wave.

The product-wave $aw$ derived from the sending $a$-productor of lagging phase at 167, 175, also flows through the common input circuit of the receiving $Aa$-productor at 174', 175', together with the $AW$ product-wave. This $aw$ product-wave will be translated by the lagging $a$-productor 175', 167' into a product-wave $a(aw)$ wherein the bracketed factors constitute the productor input wave, and the outer factor is the productor exciting wave, identical with the first wave-factor in the silent productor wave $a(AW)$ rendered in the productor output circuit 167'. Now, since this exciting wave factor $a$ is adjusted for phase quadrature or silent relation with the input wave-factor $A$ in the product wave $a(AW)$ derived from the $W$ voice, it must be approximately in phase consonance or maximum rectifying coaction with the input wave factor $a$ in the product wave $a(aw)$ derived from the $w$ voice. This conclusion follows simply from the fact that the input $Aa$ wave factors in the receiving productor 174', 175' occur in phase quadrature with each other, as they are derived from the homologous $Aa$ twin quadrature sending productor at 174, 175.

Therefore, the receiving $a$-productor at 175' will rectify the received $aw$ carrier-wave, but will not rectify the received $AW$ carrier-wave. Likewise the $A$-productor at 174' will rectify the received $AW$ carrier-wave, but will not rectify the received $aw$ carrier-wave. Hence the receivers at 120' and 130' will respectively derive the $W$ and $w$ voice waves from the transmitters 118 and 130, without interference.

More broadly it may be stated that each twin quadrature receiving productor of the system will render in the separate output circuits of its leading and lagging divisions respectively, distinct rectified currents, corresponding with the currents occurring respectively in the separate input circuits of the leading and lagging divisions of the homologous twin quadrature sending productor. In other words, the output circuits of each twin receiving productor will reproduce the currents which occur in the homologous input circuits of the corresponding sending productor. Hence the sending and receiving productors may be more conveniently contradistinguished as productors and reproductors respectively.

It will now be clear, that when the $Bb$-reproductor at 176', 177', is properly adjusted, its twin output circuits 284' and 285', will reproduce respectively the wave-trains in the twin input circuits 284 and 285 of the homologous $Bb$ productor at the sending station. That is to say, the output circuit 284' will reproduce the wave-train $X+AY+ay$ and the output circuit 285' will reproduce the wave-train $x+AZ+az$. This is because the input circuit of this twin $Bb$-reproductor receives the superposed conveyor-wave trains $$B(X+AY+ay)+b(x+AZ+az)$$

produced in the twin $Bb$-productor output coils 176, 177; and the exciting $B$-wave of the reproductor coacts with the $B$ wave-factor of the first wave-train to rectify it, while the exciting $b$-wave of the reproductor coacts with the $b$ wave-factor of the second wave train to rectify it. Of course the same may be said of these wave-trains when they are contemplated as six superposed product-waves;

$$BX+BAY+Bay+bx+bAZ+baz.$$

In this latter view it must be conceived that the first three product waves characterized by the leading $B$ wave-factor, are rectified by the $B$-reproductor 176'—172'; while the remaining three product-waves characterized by the lagging $b$ wave-factor, are rectified by the $b$-reproductor 177'—173'.

In general it may be said that each reproductor will rectify each product-wave which includes a particular wave-factor synchronous with the exciting wave of that reproductor and approximately in phase consonance therewith. Of course this means that rectification will be effected only with respect to said particular wave-factor. For instance, when the product-wave $BX$ is translated by the $B$-reproductor, its $B$ wave-factor is rectified, and may be conceived as cancelled; but the $X$ wave remains in the rectified output current. In this case there is only one factor-wave remaining unrectified, to wit, the voice wave $X$, which is therefore properly transmitted to the receiver 133', which it should actuate. When the product-wave $BAY$ is translated by the $B$-reproductor, its $B$ wave-factor is rectified and may be cancelled in tracing the rectification process of the system. But the two wave-factors $AY$ remain unrectified in the output current, so that the voice-wave $Y$ will not be audible until this remaining product wave $AY$ is translated by an $A$-reproductor, as at 178', 168'.

Now it will be clear that each product carrier-wave is completely rectified and rendered audible only when it is translated by successive reproductors whose exciting wave-trains respectively correspond with its wave-factors both in frequency and in an effective phase relation. When a voice wave is translated by a succession of sending or converging productors, it will successively acquire leading or lagging wave factors corresponding with the leading or lagging wave-trains which excite these respective productors, so that its rectification will be effected only by retranslating it through that succession of reproductors whose exciting currents respectively correspond to the said leading or lagging factor-waves and hence correspond with the said leading or lagging exciting currents in the sending productors. The reproductors need not be arranged in any particular order of frequencies, although it will generally be most convenient to arrange them in the reverse order of the sending productor frequencies, as in the accompanying diagrams.

Where the diagram indicates condensers in the input or output circuits of the reproductors or the amplifiers associated with them, it will be understood that each of these circuits may be tuned to the frequency of the shortest wave factor in the product wave-train which it is intended to transmit.

Wherever a number of amplifiers derive their input waves from a common circuit, for instance where the amplifiers 145, 146, 147, 148 are connected in parallel across the circuit 117, it will be understood that the amplifiers may be connected either in parallel, or in series as shown in Figures 13 and 14.

Figure 16 represents in abbreviated symbols the same system shown in Figure 15. It is introduced to establish a set of schematic symbols to be employed in diagrams of more extensive systems. The two-wire circuits are indicated by single lines with arrows indicating the direction of transmission. The productors and reproductors, their exciting sources, and the amplifiers, are all indicated by simple circles, but the grouping of the productors and reproductors with their exciting sources, clearly distinguishes all these elements. The input tuning condensers for the reproductors, are not indicated, but it is to be understood that they may be employed.

Figure 17 employs the symbols of Figure 15, to represent an adaptation of the invention to radio transmission.

In Figure 17, the voice waves from the transmitters T201 and T202, are translated respectively by the lagging and leading productors E and $e$, excited by the prime source E$e$ of high frequency suitable for radio-transmission. The resulting phase-differentiated product-wave-trains, or carrier-wave-trains, are superposed in the productor output circuit 220, which also receives a weak constant wave-train from a very loose coupling with the E$e$ prime source 215. The constant wave-train and voice-modulated carrier-wave-trains thus superposed in the circuit 220, are transmitted through the sending amplifier 224 and aerial coupling 226, and thence transmitted by wave propagation from the sending aerial 225 to the receiving aerial 225'.

For economy of energy, the constant E$e$ wave-train from 215 should be relatively weak in the sending aerial, and hence should be very weak in the input circuit 220 of the sending amplifier 224. The purpose of this amplifier to impart energy to the voice-modulated carrier-waves, rather than to amplify the constant unmodulated wave-component in the sending aerial. The diagram represents the constant wave from 215 as impressed on the immediate product or output circuit 220, this being the most graphic indication that the constant wave is to be superposed on the voice-modulated product-waves. But of course this result could be as well or better accomplished in practice by a non-amplifying connection between the prime source E$e$ and the sending aerial 225.

The receiving aerial 225' transmits the superposed constant and voice-modulated wave-trains through its coupling 226' to the input circuits of an acutely tuned amplifier 228 and a flat tuned amplifier 233.

From the output circuit of the acutely tuned amplifier 228 the constant wave is transmitted through the filter circuits, tuned amplifiers, and phase regulating means before described, for producing at $e$E a local source of constant E$e$ waves from which to excite the reproductors which are to retranslate the voice-modulated carrier-waves.

The flat tuned amplifier 233 will transmit both the constant and the voice-modulated E$e$ waves, but a tuning-out bridge 234 is interposed between the ouput circuit of this amplifier and the input circuit of the reproductor, to suppress the constant waves, while the phase-differentiated voice-modulated waves are selectively rectified by the leading and lagging divisions E and $e$ of the reproductor to actuate respectively the receivers R201 and R202, in response to the transmitters T201 and T202, respectively.

Figure 18 shows the system of Figure 17, in the abbreviated symbols introduced in Figure 16.

In accordance with the principles of the system of Figures 15 and 16, the E$e$ carrier-wave-train of the system of Figures 17 and 18 may be employed to convey not only the voice-waves from the transmitters T201 and T202, but also to transmit subordinate carrier waves and constant waves longer than the E$e$ waves and superposed on the said voice-waves in the input circuits of the sending E$e$-productors. For instance, such subordinate carrier-waves may be impressed on the input circuits of the sending amplifiers 216 and 217, and such subordinate constant waves may be impressed on the output circuits of these amplifiers. When this has been done, the output circuits of the receiving $e$E-reproductor will reproduce respectively all the subordinate carrier-waves and constant waves which occur in their homologous input circuits of the sending E$e$-productor. Then the reproductor output amplifiers 235 and 236 will amplify and deliver such subordinate carrier waves and constant waves superposed on the rectified voice waves. In accordance with these principles, the more extensive radio multiplex sending and receiving systems of Figures 19 and 20 respectively are evolved upon the sending and receiving apparatus of the system of Figures 17 and 18.

Figure 19:
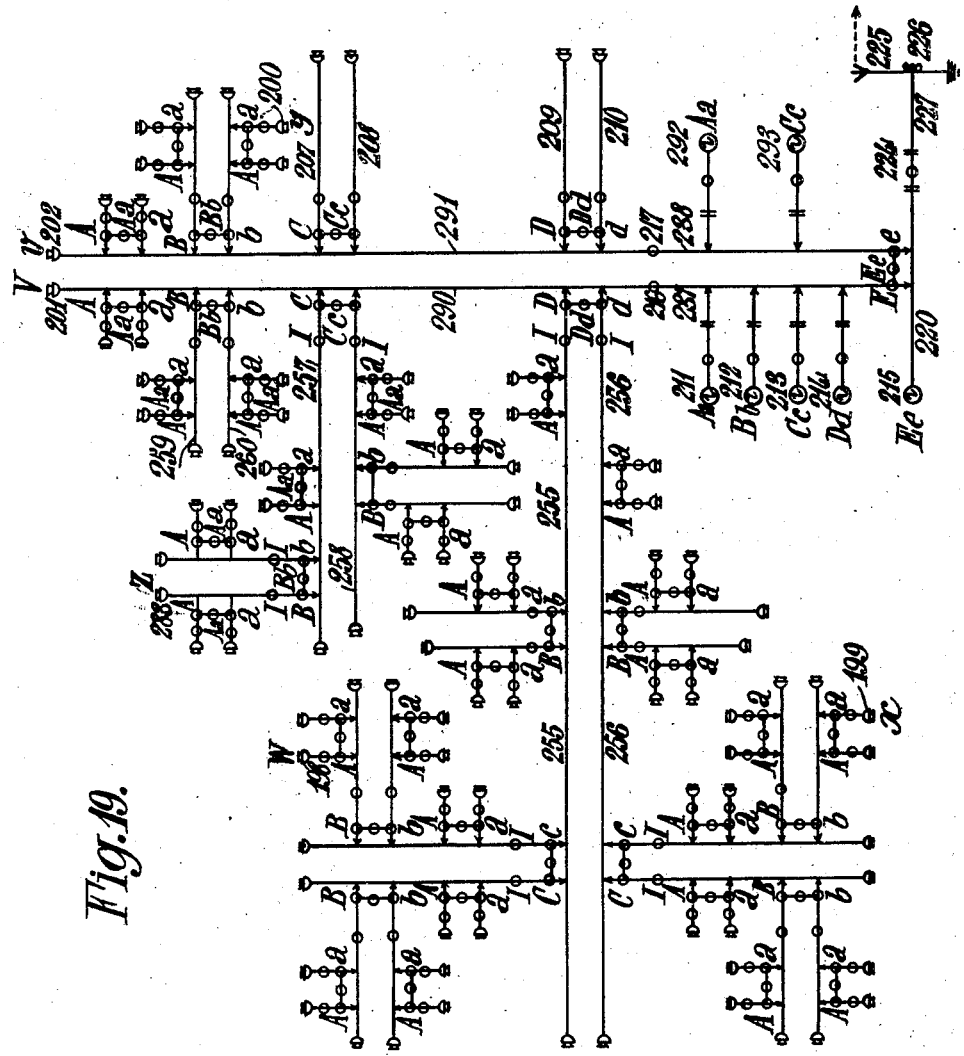
Figure 19 is a schematic diagram of a system for sending 162 simultaneous radio signals in accordance with the principles of the invention.
Figure 20:
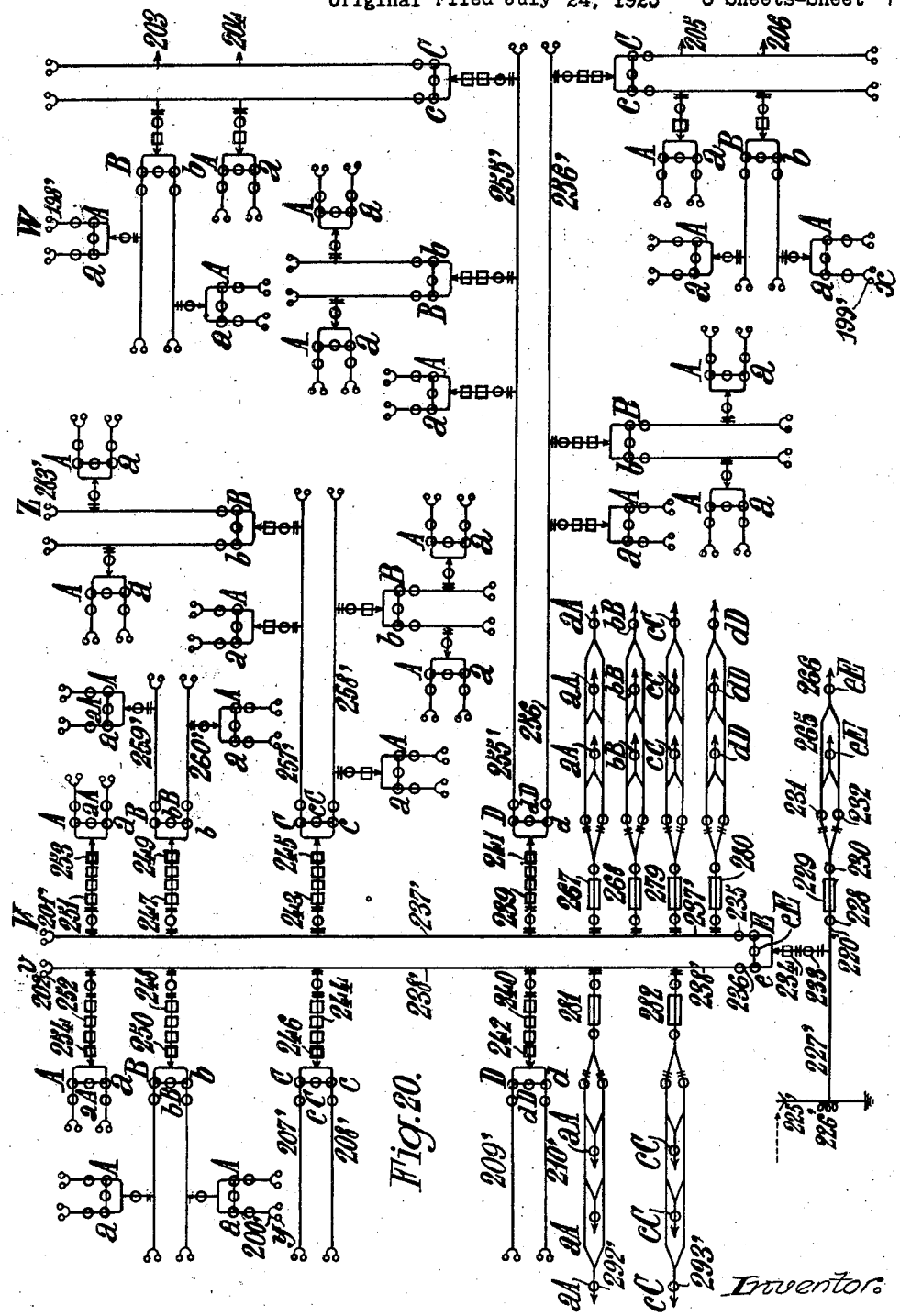
Figure 20 is a schematic diagram of a system for receiving 162 simultaneous radio signals in accordance with the principles of the invention.

Figures 19 and 20 represent radio multiplex sending and receiving systems respectively. They are schematic diagrams in the symbols of Figures 16 and 18. The receiving means of Figure 20 may be assumed to co-operate with the sending means of Figure 19, although either the sending or receiving means might also co-act with another station, different from its co-operating station thus postulated.

In Figures 19 and 20, the transmitters 201, 202 and receivers 201', 202', correspond respectively with the transmitters T201, T202 and receivers R201, R202, in Figure 18 or Figure 17. Also the system of Figures 19 and 20 corresponds with the system of Figure 17 or 18, in the sending amplifiers 216, 217, the sending twin E$e$-productor, prime E$e$ source 215, productor output circuit 220, sending amplifier 224, sending coupling 226 and aerial 225, receiving aerial 225' and coupling 226', amplifier 228 and its output connections for providing constant $e$E sources as at 265, 266, amplifier 233 and tuning-out bridge 234 for transmitting the carrier-wave-trains, twin E$e$-reproductor, and the reproductor output amplifiers 235 and 236.

With the foregoing exposition of principles and symbols Figures 19 and 20 will be almost self-explanatory. The E$e$-reproductor output circuits 237', 238', will reproduce all waves impressed respectively on the E$e$-productor input circuits 237, 238. Hence the system may be considered as though the said input circuits 237, 238 were joined with the said output circuits 237', 238' respectively, by conductive transmission lines in the manner of Figures 15 and 16 where the sending wires 115 are conductively connected with the receiving wires 117, by the transmission line 116. Hence, in this aspect, it may be said that the system of Figures 19 and 20, consists simply in a more extended development of the multiplexing arrangement of Figures 15 and 16.

For instance, in the system of Figures 19 and 20, the transmitter 201 corresponds with 110 in Figures 15 and 16; the sending line 290 corresponds with the line 113 of Figures 15 and 16; the A$a$ and B$b$ productors directly introduced into the line 290 correspond with the A$a$ and B$b$ productors likewise introduced into the line 113 of Figures 15 and 16; the sending amplifier 216 corresponds with 114 in Figures 15 and 16; the wires 237 correspond with 115, the prime sources 211, 212, correspond with 138, 137; the radio sending and receiving means correspond to the transmission line 116 of Figures 15 and 16; the receiving wires 237' correspond with 117; the means at 267 and 268 for deriving the constant $a$A and $b$B exciting waves, corresponds with the like means at 196 and 197 in Figures 15 and 16; the A$a$ and B$b$ reproductors connected with the receiving wires 237' through the tuning-out bridges at 253 and 249 respectively correspond with the A$a$ and B$b$ reproductors of Figures 15 and 16 which are connected with the receiving wires 117 through the tuning-out bridges at 190$a$ and 191$b$ respectively; and the receiver 201' corresponds with the receiver 111 of Figures 15 and 16.

The transmitter 202 and receiver 202' of Figures 19 and 20, and their associated apparatus, also correspond with the apparatus of Figures 15 and 16, in the same way as the transmitter 201, and receiver 201' with their associated apparatus. The system of Figures 19 and 20 includes two similar halves or twin sub-systems whose respective carrier wave trains are transmitted on the phase differentiated components of the E$e$ waves of the high radio frequency. One of said sub-systems works through the leading E wave and may therefore be termed the leading sub-system or the E sub-system, while the other sub-system works through the lagging $e$ wave and may therefore be called the lagging sub-system or the $e$ sub-system. In the diagrams, the $e$ sub-system is not so completely represented as the E sub-system, but it will be understood that in practice, the twin sub-systems would be equally extended.

In the system of Figures 19 and 20, each sub-system operates with carrier waves of four frequencies, A$a$, B$b$, C$c$, and D$d$, all of a lower order than the E$e$ radio frequency. These sub-system waves are supplied at the sending station by the four prime sources 211, 212, 213 and 214, and are synchronously reproduced at the receiving station by the amplifiers $a$A, $b$B, $c$C, and $d$D. These amplifiers receive their respective input waves through the filters 267, 268, 279, 280, respectively. As shown in the diagram, the E sub-system carries all four of the constant waves to be reproduced at the receiving station, but they could as well be carried by the $e$ sub-system, or each sub-system could carry a share. For instance the $e$-sub-system may carry the A$a$ and C$c$ constant waves as indicated at 292 and 293 in the sending apparatus, and at 292' and 293' in the receiving apparatus; in which event these constant waves need not be carried by the E sub-system. In any event, the constant wave-trains impressed on the sending wires 237 or 238, should be relatively weak, for economy of transmission energy. When the system of Figures 19 or 20 is to be duplexed or duplicated for reverse transmission, it will obviously be unnecessary to duplicate the means for providing synchronous carrier-wave sources at the sending and receiving stations.

In the system of Figs. 19 and 20, the input circuit of each twin reproductor may include as many tuning-out bridges as there are wave-trains to be suppressed. For instance, the D$d$-reproductor of the E sub-system derives its input waves from the receiving wires 237′ through three successive flat tuned bridges such as 239 for suppressing the constant and variable A$a$, B$b$ and C$c$ waves respectively, and through one acutely tuned bridge 241 for suppressing the constant D$d$ wave-train while transmitting the side-bands thereof to the D$d$-reproductor. Also, as another instance, the rectified output current of the D division of this reproductor includes A$a$, B$b$, and C$c$ modulated wave-trains for distribution to its three subordinate reproductors on the line 255′, wherefore each subordinate reproductor, A$a$, B$b$ or C$c$, may derive its own required input wave-train through two successive bridges tuned to successively suppress the other two wave-trains. In this latter case there are no constant wave-trains to be suppressed. It must be remembered however, that the tuning means are not considered essential to the practice of the invention.

It will be understood that the circuit leads 203, 204, 205, 206, indicate the completion of the output systems of the C reproductors subordinate to the D$d$-reproductor. It will also be understood that the entire $e$ sub-system of the line 238′ may be completed in symmetrical correspondence with the E sub-system of the line 237′.

It will be understood that the main carrier wave of the highest frequency, the E$e$ carrier-wave, may be transmitted through a conductive transmission line in lieu of the radio medium.

The working of the system of Figures 19 and 20 may now be exemplified by following the voice-wave transmission through the maximum number of productors and reproductors.

The converging translation of the voice-wave W from the transmitter 198 into the sending aerial, is effected by translation through a succession of five productors, and may be indicated by the voice-wave symbol W and the productor symbols written in their order, WAB$c$DE. This order of the symbols may therefore be referred to as the converging term of their product-wave, while their reverse order ED$c$BAW, may be called the diverging term of the product wave because it denotes the order of diverging reproductors through which it must be rectified. Of course the two terms are algebraically identical. This product carrier-wave ED$c$BAW can only be rectified by translation through a succession of reproductors whose exciting waves correspond severally with all the carrier-wave factors in the product term, and the receiving apparatus comprises only one such succession of reproductors, leading to the receiver 198′. Therefore, the voice-wave W from the transmitter 198, will be rendered in the receiver 198′, but in no other receiver. Likewise, the voice-wave from each transmitter will be rendered in its homologous receiver but in no other receiver.

It will now be convenient to derive the formula which expresses the multiplicity of the system as determined by the number of its carrier-wave frequencies. The elemental formula is to be derived from a rudimental system such as the system of Figures 15 and 16 for instance, or the E subsystem of Figures 19 and 20 considered irrespective of whether its lines 237, 237′ are connected directly or by radio-transmission on the E carrier-wave.

Now thus consider the rudimental E sub-system of Figures 19 and 20, and start with the elemental transmission line 290, 237, 237′, and there will be only one simple voice wave V transmitted over this line from the transmitter 201 to the receiver 201′.

Now, if recourse is had to the A$a$ carrier-wave, each of its phase-differentiated components will carry another independent voice-wave, in addition to the simple voice-wave V impressed directly on the line at 201. This addition is represented by the two transmitters and their two receivers working through the A$a$-productor and the A$a$-reproductor associated directly with the wires 290 and 237′ respectively. Thus the employment of the first carrier-wave frequency has multiplied the number of signals by the factor 3; and it will now appear that the possible number of signals, or the multiplexity of the system, will be multiplied by that same factor whenever one more frequency is added to the range of carrier-waves, so that the multiplexity of the system will always equal 3 to the $n$ power ($3^n$) when $n$ is the number of such carrier frequencies.

For instance, after adoption of the second B$b$ carrier-wave frequency, each of its phase-differentiated components will add as many signals as the entire system could transmit before such adoption, so that the total number of signals will be again multiplied by the same factor 3, thus increasing the multiplexity of the system to the second power of 3 when the second carrier frequency is resorted to. The same order of development increases the multiplexity of the system to the third power of 3, when the third or C$c$ frequency is introduced; and this order of development can be continued to the limit of practicability while the addition of each carrier frequency will multiply the possible number of signals by the same factor 3.

It is believed that these principles of selectivity will permit the employment of carrier-wave-trains ranging close together in their frequency order, particularly when the constant wave-trains are kept out of the reproductor input circuits. It is believed that the carrier-wave-trains may range as close as one thousand cycles in their frequency differences.

It is believed, however, that cross-talk would be developed by the employment of carrier-wave-trains having harmonic or nearly harmonic relations.

In general, the carrier-wave-frequencies must be properly chosen and related for the avoidance of audible interference, but it is believed that when this requirement is fully met, the system will still permit of an extraordinary number of frequency differentiated carrier-waves, such as to raise the multiplicity above any conceivable needs, as expressed in the afore-mentioned formula.

It appears that the practicable limit of multiplexity will not reside in the number of carrier-wave-trains transmittable without audible interference, but will rather be imposed by the circumstance that the amount of energy available for actuating each receiving device must be an inverse function of the number of signals. The practicable limit of multiplexity thus imposed by the weakening of the available received current, must of course depend on the degree of efficiency and perfection which may be attainable in the productors and reproductors and in the amplifying devices which would be inserted at suitable points in the course of transmission. This limitation to the multiplexity of the system will also depend on the degree to which foreign disturbing currents can be avoided or suppressed, for instance disturbing current developed in the transmission line or aerials by induction or statics, or disturbing fluctuations of current which may arise from imperfect working of the audion devices. The possibilities of amplifying the weak signaling currents to actuate the receivers, would of course be limited by the relative values of the said disturbing currents if they should occur in such a way that they must be amplified along with the signaling currents.

However, it seems a fair presumption that the foregoing limitations may be so extended as to permit the effective employment of so many as thirteen different carrier-wave-frequencies, which would raise the multiplicity or possible number of signals to the 13th power of 3, which equals 1,594,323.

In contemplating or measuring the foregoing limitations, it must be considered that the field of the invention is not only in long distance transmission where multiplexing has been most generally sought, but also in multiplexing the signals or short-distance local trunk-lines between the local exchanges in a large city. In this local use of the invention the transmission losses will be relatively small, and the carrier-wave sources for all local exchanges can be supplied or synchronized by special wires from a main generating station. Such multiplexing of local trunk-lines will not only become a great economic desideratum when a simple and reliable system of large multiplexity is designed, but the expedient will also remove the limitations imposed by limited conduit space in large cities and it is believed that the mere copper salvage on existing trunk line installations will more than pay the costs of reconstruction.

Figure 21:
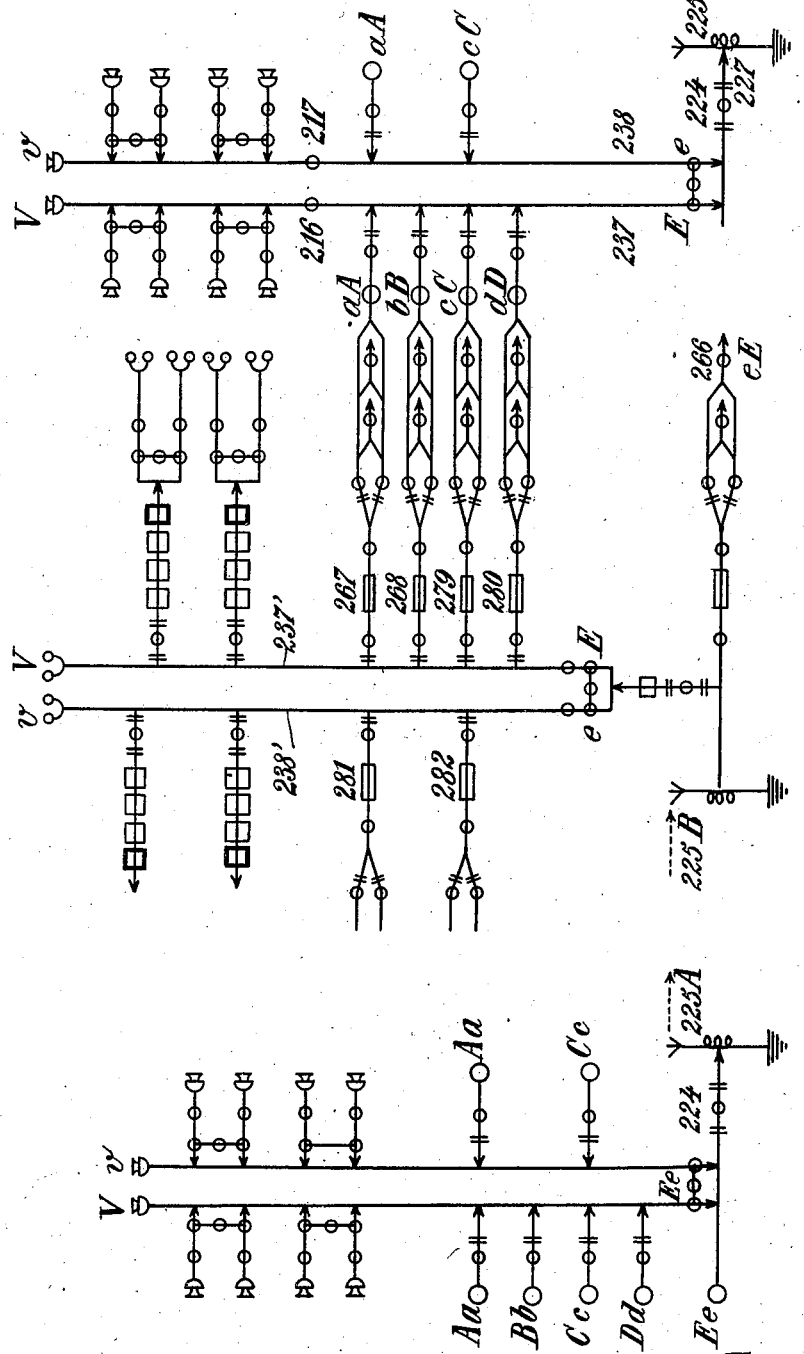
Figure 21 is a schematic diagram of a way of combining the sending and receiving systems of Figures 19 and 20, so that the carrier-waves or conveyor-waves at many different sending and receiving stations may be derived and controlled from a single station.

In the system of Figure 21, the sending aerial 225 A corresponds with the sending aerial 225 of Figure 19; and all the apparatus of Figure 19 is assumed to be symbolized in the diagrammatic elements leading to the aerial 225 A.

Likewise the receiving aerial 225 B of Figure 21 corresponds with the receiving aerial 225' of Figure 20; and the diagrammatic elements of Figure 21 are assumed to symbolize all the receiving apparatus of Figure 20, with the addition of sending apparatus corresponding with that of Figure 19. In this combination of receiving and sending apparatus, the derived carrier-wave sources $aA$, $bB$, $cC$, $dD$, and $eE$ of Figures 20 and 21, are employed as sending sources which correspond with the sending sources indicated in Figures 19 and 21 at $Aa$, $Bb$, $Cc$, $Dd$ and $Ee$, and are employed to supply all the sending apparatus leading to the sending aerial 225 C of Figure 21. But the transmissions of a constant $Ee$ wave (as at 215 of Figures 17, 18 and 19) will be omitted in the case of the sending aerial 225 C, as though a short circuit were applied to the supply transformer at 220 in Figure 17. Also, the sending aerial 225 C will preferably be arranged in some suitable differential relation to its nearby receiving aerial 225 B, as may be done in accordance with known principles and methods, so that the outgoing signal will not be repeated in the receiving apparatus.

The combined receiving and sending apparatus symbolized in the receiving and sending aerials 225 B and 225 C and associated elements, is assumed to be duplicated at many separated stations all controlled by the prime carrier waves transmitted through the aerial 225 A from the sources $Aa$, $Bb$, $Cc$, $Dd$ and $Ee$. Thus each of such stations can be maintained in synchronized communication with any other.

When the above described productors are employed as sending devices, they operate in accordance with the principle generally termed "modulation," and may therefore be generally classified as "modulators." When employed as receiving devices, they operate in accordance with the principle commonly termed "demodulation" or "rectification," and may properly be designated as "demodulators" or "receiving modulators" or "rectifiers." The following claims will employ the above quoted common technology and other established nomenclature, whether or not the same appears in the foregoing specification.

Where a carrier-wave is to be modulated directly by several modulating waves, for instance by directly superposing all those modulating waves in the input circuit of the modulator, I shall designate such a process as a joint modulation or a simultaneous modulation of the said carrier-wave by all the said modulating waves. Thus such a joint or simultaneous modulation will be distinguished from that other process which is generally termed "plural" or "successive" modulation, wherein a given carrier-wave is modulated by a second wave, while the second wave is modulated by a third wave, and the third wave by a fourth wave, and so on to any desired or practicable extension of the sequence.

In the claims the terms "subcarrier-wave" and "super-carrier-wave" will be employed relatively. For instance, in a group of frequency-differentiated carrier-waves A, B, C, D, E, the wave A may be used to modulate the wave B, and the resulting modulated wave AB may be used to modulate the wave C. In such a successive modulation ABC, the wave C is the super-carrier-wave of the sequence, the wave B is a sub-carrier-wave of lower order in that sequence, and the wave A is a sub-carrier-wave of still lower order therein. If the wave ABC thus produced is employed to modulate the wave D in a more extended sequence ABCD, then the wave C may still be designated as a super-carrier-wave in its relation to the waves A and B, notwithstanding it becomes a sub-carrier-wave in relation to the super-carrier-wave D.

It is inherent in the nature of the invention that its broad principles may be practised in many different ways which may be devised by technical skill or by supplemental invention, within the scope of the following claims.

I claim:

1. The method of multiplexing carrier-wave signals which consists in superposing in a common transmission medium, two phase-differentiated synchronous carrier-waves, independently modulating each carrier-wave in accordance with other waves which are to be transmitted, and separately translating each of said phase-differentiated carrier-waves.

2. The method of multiplexing carrier-wave signals, which consists in superposing in a common transmission medium two synchronous carrier-waves differentiated by a phase displacement less than 180 degrees, independently modulating each carrier-wave in accordance with one or more waves to be carried, and separately translating or rectifying each of said phase-differentiated carrier-waves to reproduce the carried waves which were employed to modulate it.

3. The method of multiplexing carrier-wave signals, which consists in producing two distinct modulated carrier-waves of common carrier frequency, superposing them in a common transmission medium synchronously and with a phase displacement less than 180 degrees and thus transmitting them to a receiving point, and there translating one or each of said phase-differentiated carrier-waves by interaction with a synchronous wave supplied at the receiving point and maintained in non-translative phase-relation to the other of said carrier-waves.

4. The method of multiplexing carrier-wave signals which consists in producing two wave-trains which are to be carried, causing each of said wave-trains to separately interact with a carrier-wave of a given carrier-frequency so as to produce two distinct modulated carrier-wave-trains of said given frequency, superposing said distinct modulated carrier-trains in a common transmission medium synchronously and with a phase-displacement less than 180 degrees and thus transmitting them to a common receiving point, and there translating each of said phase-differentiated carrier-trains by interaction with a synchronous wave-train supplied at said receiving point and maintained in non-translative phase-relation to the other of said carrier-trains.

5. The method of multiplexing carrier-wave signals, which consists in producing two separate waves which are to be carried, separately employing each wave to separately modulate a local wave of given carrier-frequency, superposing the resultant modulated carrier-waves in a common transmitting medium with a phase displacement less than 180 degrees and thus transmitting them to a receiving point, and there demodulating each received phase-differentiated carrier-wave by coaction with a synchronous local wave of the said carrier-frequency maintained in non-translative phase-relation to the other received carrier-wave, and deriving from a common source said local waves for both the modulating and demodulating operations.

6. The method of carrier-wave-multiplexing which consists in modulating a super-carrier-wave by two phase-differentiated sub-carrier-waves while also modulating each of said sub-carrier-waves, transmitting the super-carrier-wave, and translating the received super-carrier-wave to render the signals impressed by the said modulations.

7. The method of carrier-wave-multiplexing which consists in producing two synchronous super-carrier-waves of the same frequency, modulating each super-carrier-wave by two phase-differentiated sub-carrier-waves while also modulating each sub-carrier-wave, superposing the said synchronous super-carrier-waves with a phase displacement less than 180 degrees in a common transmission medium, and translating the received super-carrier-waves to render the signals impressed by the said modulations.

8. The method of carrier-wave-multiplexing which consists in modulating a super-carrier-wave jointly by a plurality of sub-carrier-waves of lower order while also modulating one or more of said sub-carrier-waves jointly by a plurality of modulated sub-carrier-waves of still lower order, transmitting the super-carrier-wave, and translating the received super-carrier-wave to render the signals which it carries.

9. The method of telephonic multiplexing which consists in modulating a super-carrier-wave jointly by a plurality of sub-carrier-waves while also modulating each of said sub-carrier-waves jointly by a plurality of sound-modulated sub-carrier-waves, transmitting the super-carrier-wave, and translating the received super-carrier-wave to reproduce its sound waves impressed by the said sound modulations.

10. The method of carrier-wave-multiplexing which consists in modulating a super-carrier-wave by two phase-differentiated sub-carrier-waves of lower order while also modulating one or both of said sub-carrier-waves by two modulated phase-differentiated sub-carrier-waves of still lower order, transmitting the super-carrier-wave thus modulated, and translating the received super-carrier-wave to render the signals which it thus carries.

11. The method of telephonic multiplexing which consists in modulating a super-carrier-wave by two phase-differentiated sub-carrier-waves while also modulating each sub-carrier-wave by two phase-differentiated sound-modulated sub-carrier-waves of lower order, transmitting the super-carrier-wave, and translating the received super-carrier-wave to reproduce its sound waves impressed by the said sound modulations.

12. The method of telephonic multiplexing which consists in modulating a super-carrier-wave by two phase-differentiated sub-carrier-waves of lower order while also modulating each of said sub-carrier-waves by two phase-differentiated sub-carrier-waves of still lower order, modulating each of the latter said sub-carrier-waves by two phase-differentiated sub-carrier-waves of still lower order, and thus further progressively expanding the method through progressively lower orders of bi-phase modulation, and impressing a separate voice or sound modulation directly on each ultimate sub-carrier-wave thus determined, transmitting the said super-carrier-wave thus produced, and translating the received super-carrier-wave to reproduce its voice or sound waves corresponding with the said voice or sound modulations.

13. The method of carrier-wave multiplexing which consists in employing a signaling wave and a plurality of frequency-differentiated carrier-waves in a successive modulation beginning with said signaling wave and proceeding through one or more sub-carrier-waves and ending in an ultimate super-carrier-wave, directly employing a second signaling wave jointly with one of said sub-carrier-waves to jointly modulate the carrier-wave of next higher order, transmitting the ultimate super-carrier-wave which has been thus modulated, and translating the received super-carrier-wave to reproduce the said signaling waves.

14. The method of carrier-wave multiplexing which consists in employing a signaling wave and a succession of frequency-differentiated carrier-waves in a successive modulation beginning with the signaling wave and ending with an ultimate super-carrier-wave, employing other signaling waves to directly modulate all or several of the said carrier-waves which are modulated by sub-carrier waves of lower order, transmitting the super-carrier-wave which has been thus modulated, and translating the received super-carrier-wave to reproduce all the said signaling waves.

15. The method of multiplexing carrier-wave signals which consists in modulating a super-carrier-wave jointly by a plurality of frequency-differentiated sub-carrier-waves of lower order, modulating each of said sub-carrier-waves jointly by a plurality of frequency-differentiated sub-carrier-waves of still lower order, directly modulating the latter said sub-carrier-waves by separate signal waves, employing other signaling waves to directly modulate all or several of the said carrier-waves which are modulated by sub-carrier-waves of lower order, transmitting the super-carrier-wave which has been thus modulated, and translating the received super-carrier-wave to reproduce all the said signaling waves.

16. The method of telephonic multiplexing which consists in modulating a super-carrier-wave jointly by a plurality of frequency-differentiated sub-carrier-waves of lower order, modulating each of said sub-carrier-waves jointly by a plurality of frequency-differentiated sub-carrier-waves of still lower order, modulating each of the latter said sub-carrier waves jointly by a plurality of frequency-differentiated sub-carrier-waves of still lower order, and thus further progressively expanding the method through progressively lower orders of joint modulation, and impressing a separate voice or sound modulation directly on each ultimate sub-carrier-wave thus determined, transmitting the said super-carrier-wave thus produced, and translating the received super-carrier-wave to reproduce its voice or sound waves corresponding with the said voice or sound modulations.

17. The method of carrier-wave multiplexing which consists in generating a number of frequency-differentiated carrier-waves and modulating each carrier wave of higher frequency both jointly and successively by all carrier-waves of lower frequency, employing separate signaling waves to directly modulate each carrier-wave which modulates a carrier-wave of higher frequency, then transmitting the carrier-wave of highest frequency as a super-carrier-wave with the complex modulations derived as aforesaid, and finally translating the received super-carrier-wave to reproduce the waves corresponding to the said separate signaling waves.

18. The method of carrier-wave-multiplexing which consists in generating a number of frequency-differentiated pairs of phase-differentiated carrier-waves, modulating each phase of higher frequency by each phase of lower frequency, employing separate signaling waves to modulate each phase of each carrier-wave which modulates a carrier-wave of higher frequency, superposing in a common transmission medium the two phase-differentiated carrier-waves of highest frequency as a composite super-carrier-wave having the complex modulations derived as aforesaid, and finally translating the received super-carrier wave to reproduce the waves corresponding to the said separate signaling waves.

19. The method of carrying a plurality of signals in a common medium which consists in separately modulating two carrier-waves of the same wave length, superposing them in the common medium in a displaced phase relation, and deriving either of said waves from said medium and separately translating it to render the signal contained in its modulation.

20. The method of separating carrier-wave signals which consists in superposing in a common medium two phase-differentiated synchronous carrier-waves, independently modulating said carrier-waves, and employing said phase-differentiations to separately derive from said medium the signal carried by one of said waves without interference from the other wave.

21. The method of carrier wave signaling which consists in producing and transmitting a constant wave of carrier frequency and two superposed signal-modulated waves synchronous therewith and differentiated from each other by a phase displacement less than 180 degrees, and at a receiving station producing two interactions to translate the two signals, one interaction bringing the constant component into effective superposed coaction with the modulated wave of leading phase and ineffective superposed coaction with the lagging modulated wave, and the other interaction bringing the constant component into effective superposed coaction with the lagging modulated wave and ineffective superposed coaction with the leading modulated wave.

22. The method of claim 21 further qualified by a quadrature phase difference between the modulated wave components.

23. The method of claim 21 further qualified by a phase angle of the constant component intermediate between the leading and lagging modulated waves at the transmitting station.

24. The method of multiplexing two phonetic signals in a common medium, which consists in producing a composite carrier wave containing two phase-differentiated components, modulating each carrier component by one of the phonetic signals, and impressing the composite carrier wave on the common medium.

In witness whereof, I have affixed my signature to this specification, at Paris, France, on this 13th day of July, 1923.

ALBERT VAN TUYL DAY.